(12) United States Patent
Tsai

(10) Patent No.: US 9,926,033 B1
(45) Date of Patent: Mar. 27, 2018

(54) HANDLEBAR SHOCK ABSORBING DEVICE OF BICYCLES

(71) Applicant: Chin-Sung Tsai, New Taipei (TW)

(72) Inventor: Chin-Sung Tsai, New Taipei (TW)

(73) Assignee: DAH KEN INDUSTRIAL CO., LTD., New Taipei (TW)

( * ) Notice: Subject to any disclaimer, the term of this patent is extended or adjusted under 35 U.S.C. 154(b) by 0 days.

(21) Appl. No.: 15/437,451

(22) Filed: Feb. 21, 2017

(51) Int. Cl.
*B62K 21/20* (2006.01)
*B62K 21/14* (2006.01)

(52) U.S. Cl.
CPC ............ *B62K 21/20* (2013.01); *B62K 21/14* (2013.01)

(58) Field of Classification Search
CPC .............................. B62K 21/14; B62K 21/20
See application file for complete search history.

(56) References Cited

U.S. PATENT DOCUMENTS 9,085,337 B2 * 7/2015 Jordan .................. B62K 21/20
2017/0008596 A1 * 1/2017 D'Aluisio ............. B62K 21/20

* cited by examiner

*Primary Examiner* — Thomas C Diaz

(57) ABSTRACT

A handlebar shock absorbing device includes a sleeve in which a tube is co-rotatably inserted. A rod is inserted into the tube. A first spring is axially received in the sleeve and contacts the tube. A second spring is located in the tube and located between the rod and a cap on top of the tube. The first and second springs absorb shocks transferred to the handlebar.

5 Claims, 4 Drawing Sheets

HANDLEBAR SHOCK ABSORBING DEVICE OF BICYCLES

BACKGROUND OF THE INVENTION

1. Fields of the Invention

The present invention relates to a handlebar shock absorbing device, and the shock absorbing device is installed in the head tube of the bicycle.

2. Descriptions of Related Art

The conventional bicycle shock absorbing device for releasing shocks transferring to the handlebar includes a spring received in each of two extensions of the front fork, so that when the shocks are transferred from the ground to the handlebar, the springs absorb the shocks. However, the springs in the front fork cannot absorb the shocks as expected, and the rider still feels significant vibration from the handlebar.

The present invention intends to provide a handlebar shock absorbing device which is installed in the head tube of the bicycle so as to absorb the shocks efficiently.

SUMMARY OF THE INVENTION

The present invention relates to a handlebar shock absorbing device and comprises a sleeve having a first polygonal section defined in the inner periphery thereof. A first end member is connected to the lower end of the sleeve which is inserted into the steering tube. A first spring is axially received in the sleeve, and the lower end of the first spring contacts the first end member. A tube has a second polygonal section defined in the outer periphery thereof. A second end member is connected to the lower end of the tube. The second end member has a hole centrally defined therethrough. The tube is inserted into the sleeve, and the second polygonal section is engaged with the first polygonal section of the sleeve with a polygonal bush located between the first and second polygonal sections. The top end of the first spring contacts the second end member.

A rod has a flange extending radially from the top end thereof. The rod is inserted into the tube and extends through the first spring. A lower end of the rod is fixed to the first end member. A second spring is located in the tube, and the lower end of the second spring contacts the flange of the rod. A handlebar stem is securely connected to outside of the tube by a first fastening ring of the handlebar stem. A cap is connected to the first fastening ring and presses the top end of the second spring.

Preferably, the first end member has an aperture, and the lower end of the rod extends through the aperture and has a threaded hole. A bolt extends through the first end member and is threadedly connected to the threaded hole to connect the rod to the first end member.

Preferably, a buffering sleeve is located between the first fastening ring and the outside of the tube.

Preferably, a clip member is mounted to the steering tube to securely connect the steering tube to the sleeve.

Preferably, at least one washer is located between the sleeve and the clip member.

The advantages of the present invention are that the first and second springs respectively absorb the shocks transferred from the ground to the handlebar. The downward pressure transferred to the front fork and the front wheel via the front fork is reduced, such that the front fork and the front wheel are freely moved up and down. The front fork and the front wheel are easily controlled and not affected by the force applied to the handlebar.

The first and second springs are received in the sleeve and the tube so as to avoided mud or dust from attaching to the springs. The first and second springs are also so protected by the sleeve and the tube so that the first and second springs have longer life.

The tube and sleeve are co-rotated, and the sleeve is fixed to the front fork, so that the rotation of the sleeve drives the front fork and the steering tube via the tube and the sleeve. The turning of the front wheel is well controlled, and the handlebar transfers force to the front fork precisely.

The connection between the sleeve and the tube is made by the first and second polygonal sections, the handlebar stem is well positioned. The handlebar and the head tube do not shake.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
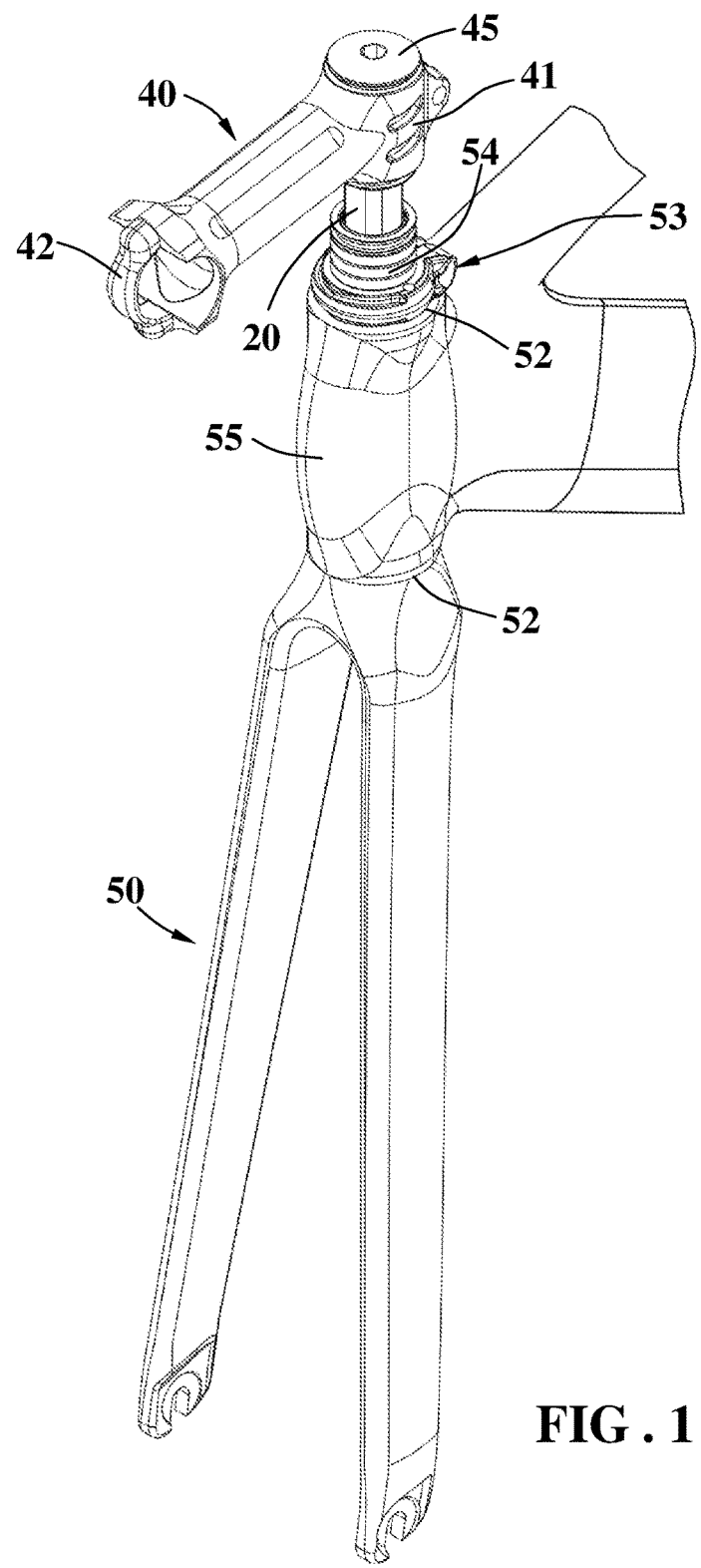
FIG. 1 is a perspective view to show the handlebar shock absorbing device of the present invention installed to the head tube of a bicycle.
Figure 2:
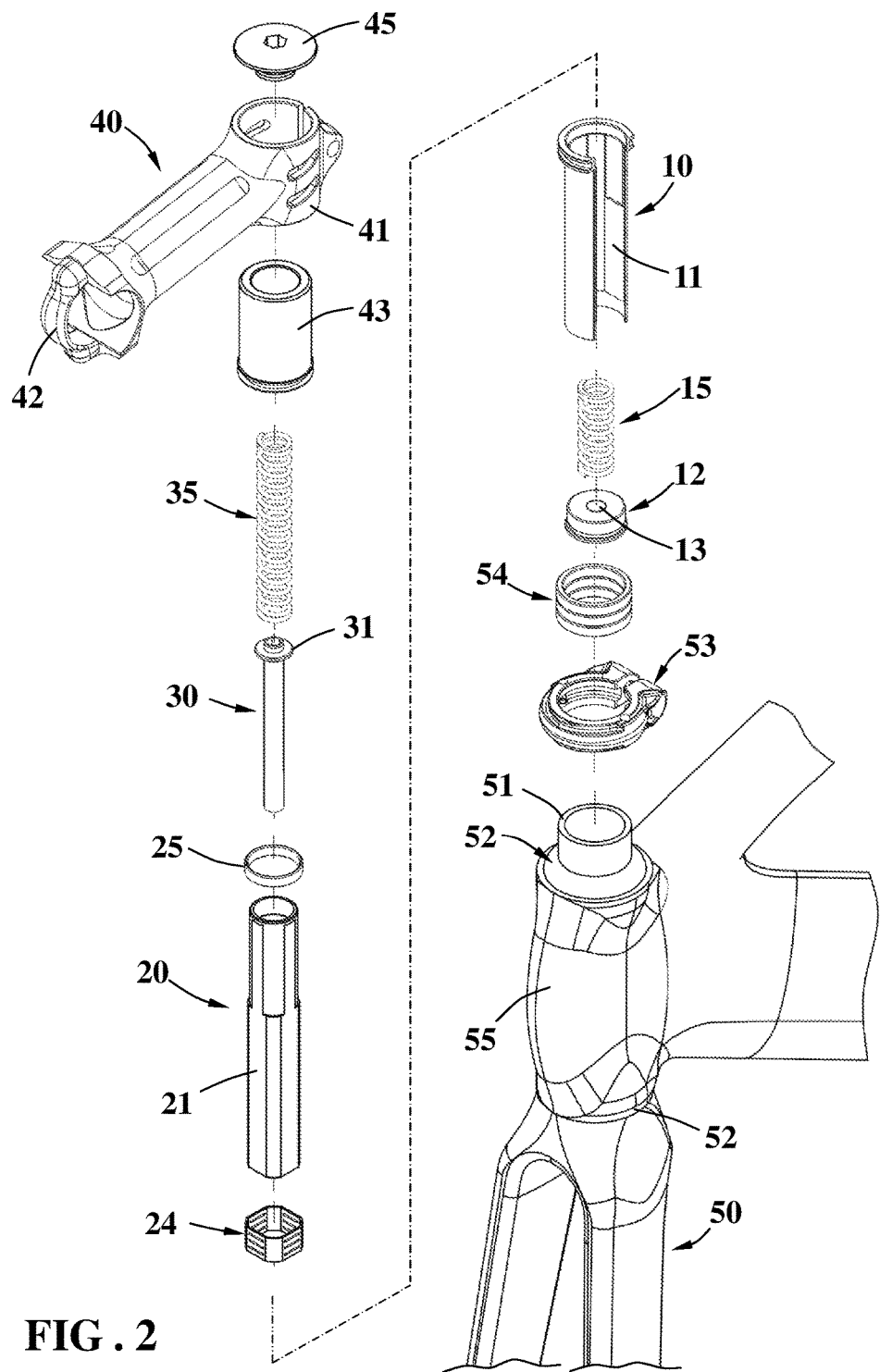
FIG. 2 is an exploded view of the handlebar shock absorbing device of the present invention.
Figure 3:
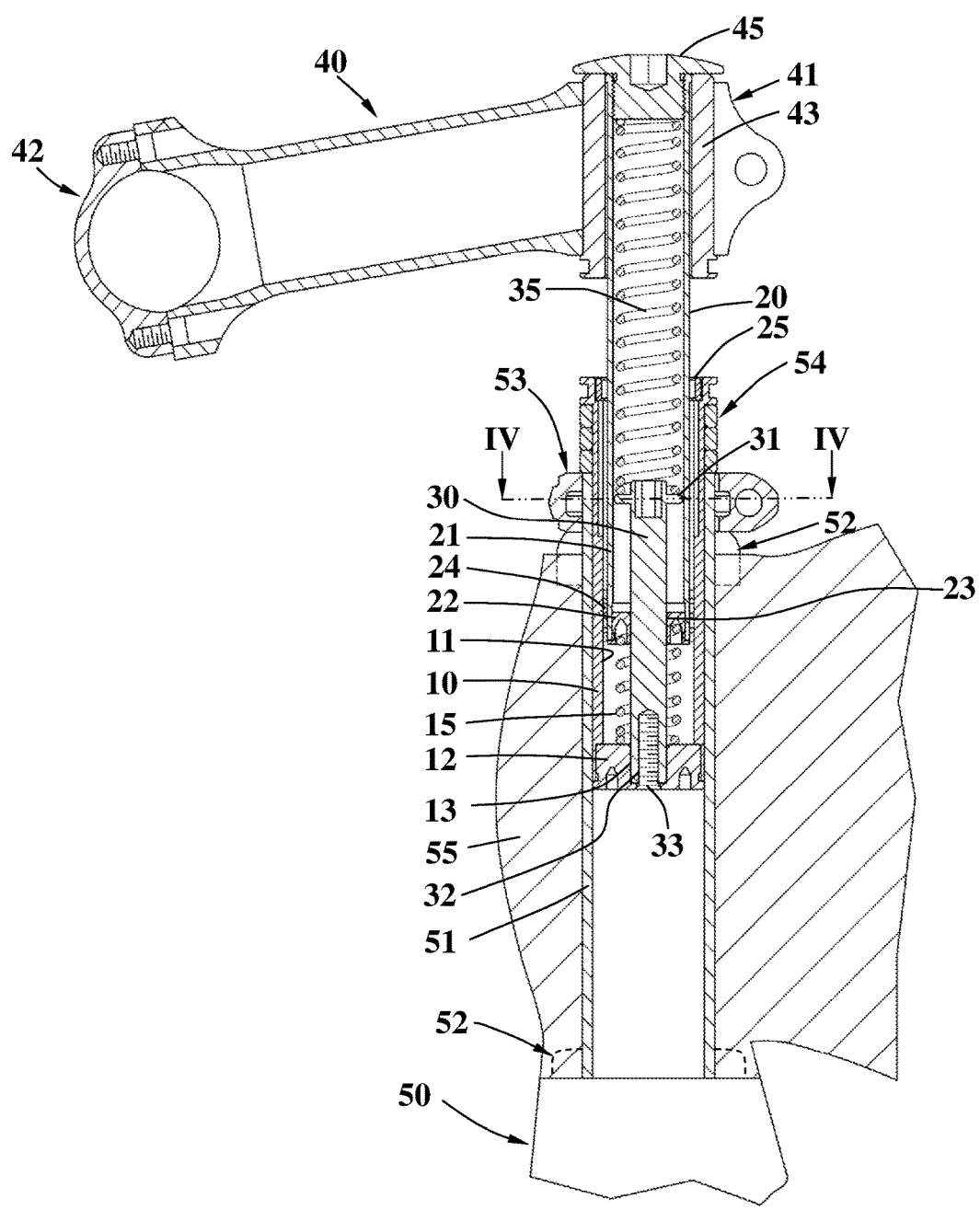
FIG. 3 is a side cross sectional view of the handlebar shock absorbing device of the present invention.
Figure 4:
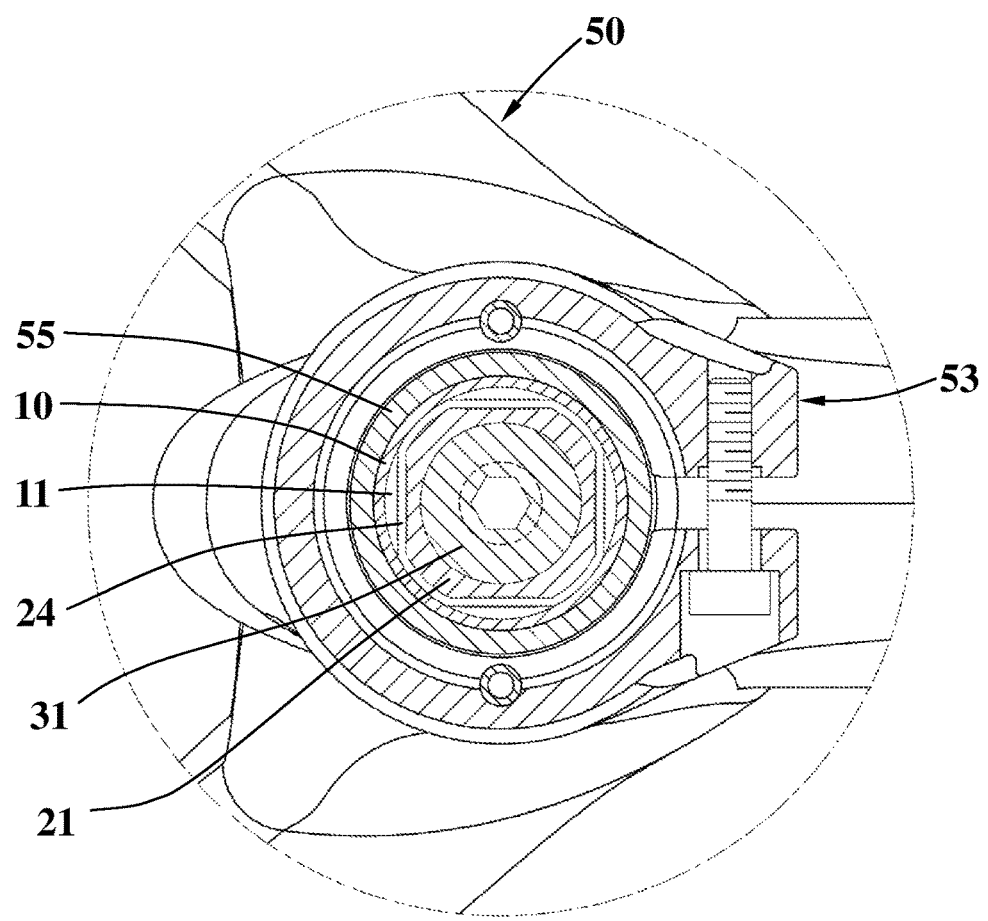
FIG. 4 is a cross sectional view, taken along line IV-IV in FIG. 3.

Referring to FIGS. 1 to 4, the handlebar shock absorbing device of the present invention comprises a sleeve 10 which has a first polygonal section 11 defined in the inner periphery thereof. A first end member 12 is connected to the lower end of the sleeve 10, and the sleeve 10 is inserted into a steering tube 51. A first spring 15 is axially received in the sleeve 10 and the first spring 15 is a compression spring. The lower end of the first spring 15 contacts the first end member 12. The first end member 12 has an aperture 13.

A tube 20 has a second polygonal section 21 defined in the outer periphery thereof. A second end member 22 is connected to the lower end of the tube 20. The second end member 22 has a hole 23 centrally defined therethrough. The tube 20 is inserted into the sleeve 10, and the second polygonal section 21 engaged with the first polygonal section 21 of the sleeve 10 with a polygonal bush 24 located between the first and second polygonal sections 11, 21. The top end of the first spring 15 contacts the second end member 22. By the polygonal bush 24, the tube 20 is able to compress the first spring 15 and move up and down in the sleeve 10. A ring 25 is located between the sleeve 10 and the tube 20. The polygonal bush 24 and the ring 25 reduce wearing between the sleeve 10 and the tube 20.

A rod 30 has a flange 31 extending radially from the top end thereof. The diameter of the flange 31 is substantially the same as the inner diameter of the tube 20. The rod 30 is inserted into the tube 20 and extends through the first spring 15. The lower end of the rod 30 is fixed to the first end member 12. Specifically, the lower end of the rod 30 extends through the aperture 13 and has a threaded hole 32. A bolt 33 extends through the first end member 12 and is threadedly connected to the threaded hole 32 to connect the rod 30 to the first end member 12.

A second spring 35 is located in the tube 20, and the lower end of the second spring 35 contacts the flange 31 of the rod 30.

A handlebar stem 40 includes a first fastening ring 41 and a second fastening ring 42 on two ends thereof. The handlebar stem 40 is securely connected to outside of the tube 20 by the first fastening ring 41 of the handlebar stem 40. The second fastening ring 42 is used to connect the handlebar (not shown) and the handlebar stem 40. A buffering sleeve 43 is located between the first fastening ring 41 and the outside of the tube 20. A cap 45 is connected to the first fastening ring 41 and presses the top end of the second spring 35.

The steering tube 51 extends through the front fork 50 and the head tube 55 of the bicycle. A headset 52 is connected to each of two ends of the head tube 55 so that the steering tube 51 is freely rotated in the head tube 55.

The sleeve 10 is inserted into the steering tube 51 and securely connected to the steering tube 51 by the clip member 53 on the outside of the steering tube 51. The number of the washer 54 can be increased according to practical need. When the handlebar turns, the handlebar stem 40 immediately rotates the tube 20. Because the engagement between the first and second polygonal sections 11, 21, the tube 20 drives the sleeve 10 to turn, and the sleeve 10 turns the front fork 50 and the steering tube 51. Besides, the engagement between the first and second polygonal sections 11, 21 well positions the handlebar stem 40, so that the handlebar and the head tube do not shake randomly.

When the shocks are transferred to the front fork 50 from the ground, the steering tube 51 receives the shocks, and the first end member 12 and the rod 30 move up and down. The first and second springs 15, 35 absorb the axial shocks to reduce the shocks and vibration transferred to the tube 20 and the handlebar stem 40 from the front fork 50.

When the rider tilts forward or stands upright, the rider applies a larger force downward to the handlebar, the handlebar stem 40 is applied by a larger downward force which makes the tube 20 and the second end member 22 move downward in the sleeve 10 to compress the first and second springs 15, 35 to absorb the shocks. The shocks that are transferred to the front fork 50 and the front wheel from the steering tube 51 are reduced. Therefore, the front fork 50 and the front wheel are easily operated and able to move freely.

While we have shown and described the embodiment in accordance with the present invention, it should be clear to those skilled in the art that further embodiments may be made without departing from the scope of the present invention.

What is claimed is:

1. A handlebar shock absorbing device comprising:
   a sleeve having a first polygonal section defined in an inner periphery thereof, a first end member connected to a lower end of the sleeve, the sleeve inserted into a steering tube;
   a first spring axially received in the sleeve, a lower end of the first spring contacting the first end member;
   a tube having a second polygonal section defined in an outer periphery thereof, a second end member connected to a lower end of the tube, the second end member having a hole centrally defined therethrough, the tube inserted into the sleeve, the second polygonal section engaged with the first polygonal section of the sleeve with a polygonal bush located between the first and second polygonal sections, a top end of the first spring contacting the second end member;
   a rod having a flange extending radially from a top end thereof, the rod inserted into the tube and extending through the first spring, a lower end of the rod fixed to the first end member;
   a second spring located in the tube, a lower end of the second spring contacting the flange of the rod;
   a handlebar stem securely connected to outside of the tube by a first fastening ring of the handlebar stem, and
   a cap connected to the first fastening ring and pressing a top end of the second spring.

2. The handlebar shock absorbing device as claimed in claim 1,
   wherein the first end member has an aperture, the lower end of the rod extends through the aperture and has a threaded hole, a bolt extends through the first end member and threadedly connected to the threaded hole to connect the rod to the first end member.

3. The handlebar shock absorbing device as claimed in claim 2, wherein a buffering sleeve is located between the first fastening ring and the outside of the tube.

4. The handlebar shock absorbing device as claimed in claim 1, wherein a clip member is mounted to the steering tube to securely connect the steering tube to the sleeve.

5. The handlebar shock absorbing device as claimed in claim 4, wherein at least one washer is located between the sleeve and the clip member.

* * * * *